United States Patent
Kim

(10) Patent No.: US 10,042,468 B2
(45) Date of Patent: Aug. 7, 2018

(54) TOUCH PANEL AND DISPLAY APPARATUS INCLUDING THE SAME

(71) Applicant: LG ELECTRONICS INC., Seoul (KR)

(72) Inventor: Minchul Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 15/214,616

(22) Filed: Jul. 20, 2016

(65) Prior Publication Data

US 2017/0024066 A1    Jan. 26, 2017

(30) Foreign Application Priority Data

Jul. 20, 2015    (KR) .................. 10-2015-0102547

(51) Int. Cl.
    *G06F 3/045*     (2006.01)
    *G06F 3/041*     (2006.01)
    *G06F 3/044*     (2006.01)

(52) U.S. Cl.
    CPC ............ *G06F 3/0416* (2013.01); *G06F 3/044* (2013.01); *G06F 3/0412* (2013.01); *G06F 2203/04103* (2013.01); *G06F 2203/04111* (2013.01); *G06F 2203/04112* (2013.01)

(58) Field of Classification Search
    CPC ...... G06F 3/0416; G06F 3/0412; G06F 3/044; G06F 2203/04103; G06F 2203/04111; G06F 2203/04112
    See application file for complete search history.

(56) References Cited

U.S. PATENT DOCUMENTS

| | | | |
|---|---|---|---|
| 2012/0062248 A1* | 3/2012 | Lee | .................. G06F 3/044 324/679 |
| 2012/0105370 A1 | 5/2012 | Moore | |
| 2013/0002588 A1 | 1/2013 | Bae | |
| 2013/0106781 A1 | 5/2013 | Oh | |
| 2014/0256074 A1 | 9/2014 | Kim | |

FOREIGN PATENT DOCUMENTS

WO    WO 2015/069048    5/2015

OTHER PUBLICATIONS

International Search Report (Full English Text) dated Nov. 17, 2016 issued in Application No. PCT/KR2016/007876.

* cited by examiner

*Primary Examiner* — Adam R Giesy
(74) *Attorney, Agent, or Firm* — KED & Associates LLP

(57) ABSTRACT

Disclosed is a touch panel including a conductive film having first and second electrodes on one surface thereof. The first electrode includes first sensor parts spaced apart from one another in a first direction and extending a long length in a second direction, and first wiring parts electrically connected to the first sensor parts. The second electrode includes second sensor parts spaced apart from one another in the first direction and having a shape complementary to the first sensor parts, and a second wiring part electrically connected to the second sensor parts. Each second sensor part includes first and second sensor portions located at first and second positions in the second direction. The second wiring part includes first and second connection portions for connecting the first or second sensor portions of the second sensor parts to one another, the second connection portion being located adjacent to the first wiring part.

20 Claims, 10 Drawing Sheets

TOUCH PANEL AND DISPLAY APPARATUS INCLUDING THE SAME

CROSS-REFERENCE TO RELATED APPLICATION

This application claims priority under 35 U.S.C. § 119 to Korean Patent Application No. 10-2015-0102547, filed on Jul. 20, 2015, whose entire disclosure of is hereby incorporated by reference.

BACKGROUND

1. Field

The present disclosure relates to a touch panel and a display apparatus including the same, and more particularly, to a touch panel having an improved structure and a display apparatus including the same.

2. Background

Recently, touch panels have been applied to various electronic apparatuses such as, for example, display apparatuses, for the sake of user convenience. Such a touch panel may include a first conductive film provided with a first electrode and a second conductive film provided with a second electrode, which serve to sense a touch, a cover glass substrate which is disposed at an uppermost layer over the front side of the first and second conductive films to constitute an outer surface, and adhesive layers for bonding therebetween.

In the touch panel as described above, when the first conductive film provided with the first electrode and the second conductive film provided with the second electrode are formed separately, the touch panel is required to have a complicated stack structure and be thick and heavy. In addition, the manufacturing costs of the touch panel increase, which may deteriorate price competitiveness.

BRIEF DESCRIPTION OF THE DRAWINGS

The embodiments will be described in detail with reference to the following drawings in which like reference numerals refer to like elements wherein.

DETAILED DESCRIPTION

Figure 1:
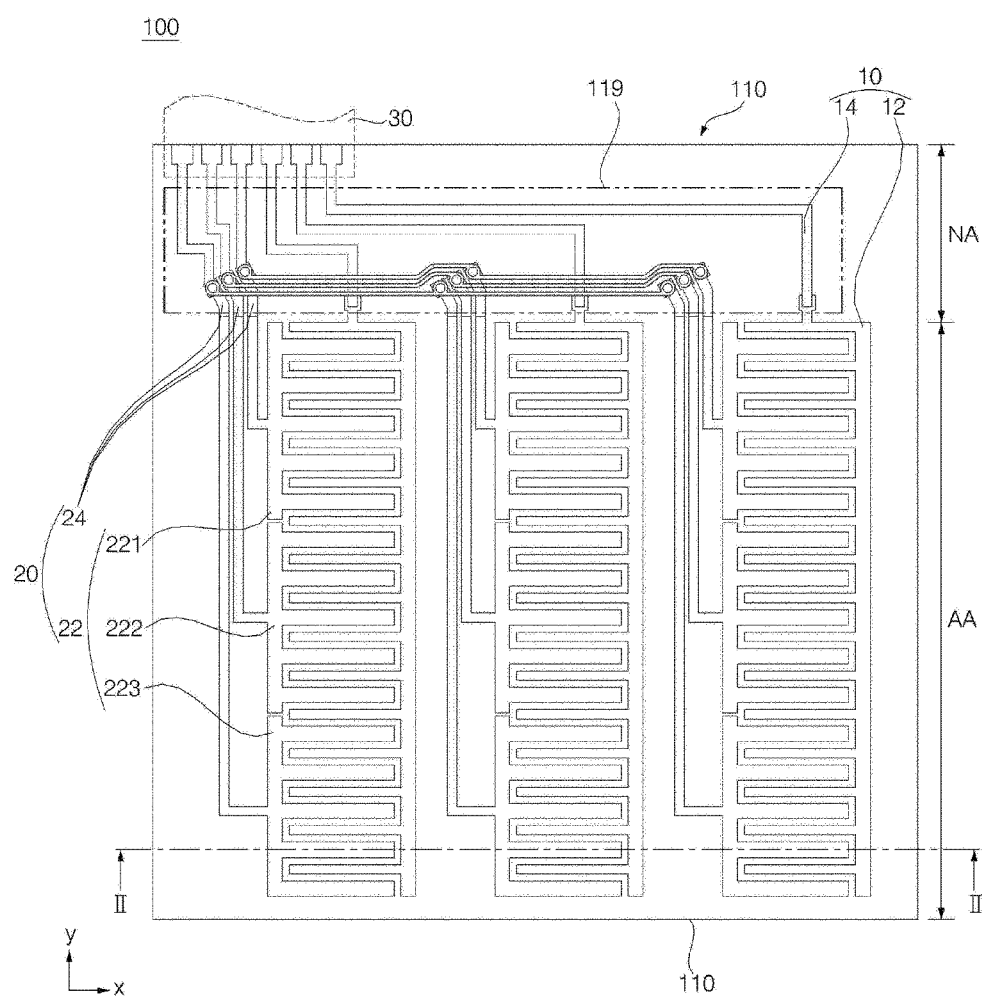
FIG. 1 is a plan view schematically illustrating a touch panel in accordance with an embodiment of the present disclosure.
Figure 2:
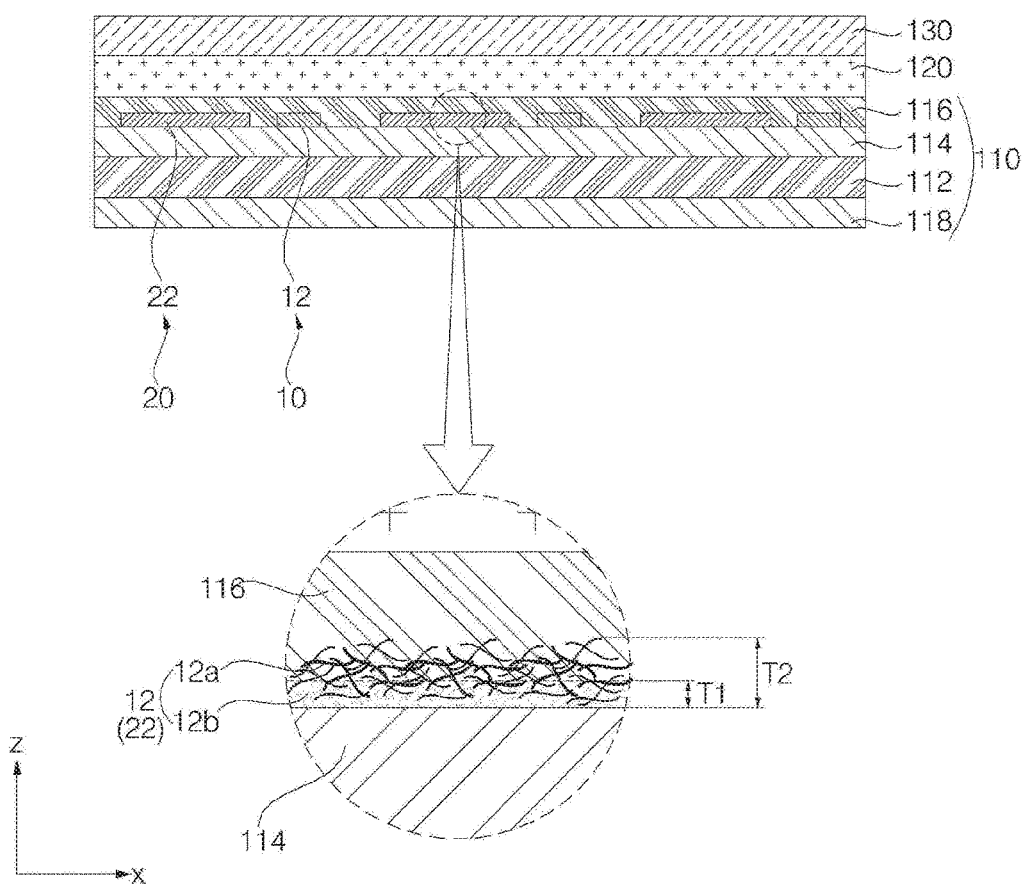
FIG. 2 shows sectional views taken along line II-II of FIG. 1.

FIG. 1 is a plan view schematically illustrating a touch panel in accordance with an embodiment of the present disclosure, and FIG. 2 are sectional views taken along line II-II of FIG. 1. For clear and brief illustration, in FIG. 1, a first hard coating layer 114, an over-coating layer 116, a transparent adhesive layer 120, and a cover substrate 130 are not illustrated, and a flexible printed circuit board 30 and an insulation layer 119 are illustrated respectively by a dotted line and a dashed line.

Referring to FIGS. 1 and 2, a touch panel, designated by reference numeral 100, in accordance with the present embodiment may include an active area AA and a non-active area NA located around the active area AA. The active area AA is an area in which sensor parts 12 and 22 of first and second electrodes 10 and 20 are arranged to sense a touch of the user's hand or an input device such as, for example, a stylus pen. The non-active area NA is an area in which, for example, a flexible printed circuit board (FPCBs) 19, which is connected to an external component (an external circuit, for example, a touch control unit (not illustrated) for controlling the touch panel 100 of a display apparatus) for the transmission of information sensed in the active area AA, and wiring parts 14 and 24 of the first and second electrodes 10 and 20 connected to the FPCB 30 are arranged. In addition, for example, a bezel (not illustrated) or a black printed layer (not illustrated), which serves to physically secure, for example, various layers and elements constituting the touch panel 100 and to cover these and various other elements arranged in the non-active area NA, may be arranged in the non-active area NA. The present embodiment illustrates the non-active area NA as being formed around the outer periphery of the active area AA on the same plane when viewed from the front side. However, the present disclosure is not limited thereto, and various other alterations are possible, for example, the non-active area NA may be not visible in front view or plan view.

The touch panel 100 in accordance with the present embodiment includes a conductive film 110 provided with both the first electrode 10 and the second electrode 20. The first electrode 10 may include the first sensor part 12 located in the active area AA and the first wiring part 14 located in the non-active area NA, and the second electrode 20 may include the second sensor part 22 located in the active area AA and the second wiring part 24 located in the non-active area NA. At this time, both the first sensor part 12 of the first electrode 10 and the second sensor part 22 of the second electrode 20 are arranged on one surface of the single conductive film 110, which may simplify the structure of the touch panel 100. In the present embodiment, the first and second wiring parts 14 and 24, which connect the first and second sensor parts 12 and 22 to the external unit or the flexible printed circuit board 30, have an improved structure so as to further simplify the structure of the touch panel 100. This will be described below in more detail. In addition, the touch panel 100 may further include a cover substrate 130, and a transparent adhesive layer 120 for attaching the cover substrate 130 and the conductive film 110 to each other. However, the cover substrate 130 and the transparent adhesive layer 120 are not necessary, and various other alterations are possible.

The cover substrate 130 may be formed of a material, which may protect the touch panel 100 from external shocks and allow light to be transmitted through the touch panel 100. For example, the cover substrate 130 may be formed of glass or plastic. However, the present disclosure is not limited thereto, and various other alterations with regard to, for example, the constituent material of the cover substrate 130 are possible.

The transparent adhesive layer 120 may be interposed between (i.e. may come into contact with) the cover substrate 130 and the conductive film 110, so as to bond them to each other. Because the touch panel 100 may be fabricated through the use of the single transparent adhesive layer 120 described above, the stack structure of the touch panel 100 may be simplified.

The transparent adhesive layer 120 may be formed of a material that is adhesive in order to allow layers disposed on both sides thereof to be attached thereto, and may also be translucent and, more particularly, may be formed of an optically clear adhesive (OCA). The optically clear adhesive has excellent adhesive force as well as high moisture tolerance, heat resistance, and processibility in order to prevent deterioration of the first electrode 10 and/or the second electrode 20. The transparent adhesive layer 120 may be formed of any of various known optically clear adhesives.

The conductive film 110 includes a base film 112, and the first electrode 10 (more particularly, the first sensor part 12) and the second electrode 20 (more particularly, the second sensor part 22) formed on one surface of the base film 112 so as to be spaced apart from each other. In addition, the conductive film 110 may include a first hard coating layer 114 interposed between the base film 10 and the first and second electrodes 10 and 20, an over-coating layer 116 disposed to cover the first and second electrodes 10 and 20 and the base film 112 (more particularly, the first hard coating layer 114) at least in the active area AA, and a second hard coating layer 118 disposed on the other surface of the base film 112.

The base film 112 may take the form of a film or sheet, for example, which is formed of a material that has light transmittance and insulation and maintains the mechanical strength of the conductive film 110. The base film 112 may be formed of at least one of polyethylene, polypropylene, polyethylene terephthalate, polyethylene-2,6-naphthalate, polypropylene terephthalate, polyimide, polyamideimide, polyethersulfone, polyetheretherketone, polycarbonate, polyarylate, cellulose propionate, polyvinyl chloride, polyvinylidene chloride, polyvinyl alcohol, polyetherimide, polyphenylene sulfide, polyphenylene oxide, polystyrene and the like. For example, the base film 112 may be formed of polyethylene terephthalate. However, the present disclosure is not limited thereto, and the base film 112 may be formed of any of various other materials excluding the aforementioned materials.

The first hard coating layer 114 is formed over one surface of the base film 112. In the present embodiment, various properties of the first and second electrodes 10 and 20 may be improved by positioning the first hard coating layer 114 between the base film 112 and the first and second electrodes 10 and 20. This will be described later in detail after the first and second electrodes 10 and 20 and the over-coating layer 116 are first described.

In the present embodiment, the first sensor part 12 and the second sensor part 22 may be disposed over one surface of the base film 112 (more particularly, over the first hard coating layer 114 disposed on one surface of the base film 112) on the same plane. In the present embodiment, the first sensor part 12 and the second sensor part 22 comprises a transparent conductive material that exhibits conductivity and light transmittance. For example, the first and second sensor parts 12 and 22 may include conductors 12*a*, which are formed of a metal nano material having a network structure (for example, metal nano-wires such as, for example, silver nano-wires, copper nano-wires, or platinum nano-wires, most particularly, silver nano-wires). Here, the network structure may be understood as a structure in which neighboring nano-material conductors such as, for example, nano-wires, are meshed at contact points thereof to form, for example, an irregular net structure or an irregular mesh structure, thereby achieving electrical connection via the contact points.

The first and second sensor parts 12 and 22, which include the nano-material conductors 12*a* forming a network structure, may be formed such that the nano-material conductors 12*a* are located in a layer having an even thickness, or such that voids are defined between the nano-material conductors 12*a*. In practice, the first and second sensor parts 12 and 22 are formed by applying a mixture of the nano-material conductors 12*a* and, for example, an extremely small amount of a solvent or binder. As such, in the first and second sensor parts 12 and 22, a residual portion 12*b*, which is formed of a solvent or binder residue, is formed into a relatively thin first thickness T1, and the conductors 12*a* extend to the outside of the residual portion 12*b*. With this configuration, the network structure, configured by the conductors 12*a*, may have a relatively thick second thickness T2. In the following description, the thickness of the first or second sensor part 12 or 22 is not the first thickness T1 of the residual portion 12*b*, but refers to the overall thickness of the residual portion 12*b* and the layer of the conductors 12*a* protruding upward from the residual portion 12*b*, i.e. the second thickness T2.

In the case where the first and second sensor parts 12 and 22 include the nano-material conductors 12*a* formed of a transparent conductive material, the first and second sensor parts 12 and 22 may be formed by wet coating, which entails lower process costs than deposition. That is, the first and second sensor parts 12 and 22 may be formed by forming an electrode layer via wet coating in which, for example, paste, ink, a mixture, or a solution containing nano-material conductors in the form of, for example, nano-wires, is applied, and subsequently patterning the formed electrode layer. At this time, the density of the nano-material conductors 12*a* in the solution, mixture, or paste used in the wet coating is very low (for example, 1% or less). As such, costs required to form the first and second sensor parts 12 and 22 may be reduced, resulting in improved productivity.

In addition, when the first and second sensor parts 12 and 22 include the nano-material conductors 12*a*, the first and second sensor parts 12 and 22 may have low resistance and excellent electrical characteristics as well as high light transmissivity. For example, silver nano-wires may be easily fabricated because the surfaces of silver (Ag) nano particles have several crystalline faces and thus can easily induce anisotropic growth. The silver nano-wires have a resistance of approximately 10 Ω/cm to 400 Ω/cm, thus realizing low resistance (for example, within a range from 10 Ω/cm to 150 Ω/cm). As such, the first and second sensor parts 12 and 22 having any resistance within a wide range may be formed. In particular, the first and second sensor parts 12 and 22 having better electrical conductivity than indium tin oxide, which has a resistance in the approximate range from 200 Ω/cm to 400 Ω/cm, may be formed. In addition, the silver nano-wires may have a superior light transmissivity to indium tin oxide, and for example may have a light transmissivity of 90% or more. In addition, the silver nano-wires are flexible and thus may be applied to a flexible apparatus and ensure stable material supply.

The nano-wires (more particularly, silver nano wires) described above may have, for example, a radius within a range from 10 nm to 60 nm and a length within a range from 10 μm to 200 μm. This range of good aspect ratio (for example, a range from 1:300 to 1:20,000) may ensure the good formation of a network structure and prevent the first and second sensor parts 12 and 22 from being easily perceived by the user. However, the present disclosure is not limited thereto, and the radius, length, and aspect ratio of the nano wires may have any of various values.

The thickness of the first and second sensor parts 12 and 22 may vary in various ways according to the size of the touch panel 100, the required resistance value, and the materials of the first and second sensor parts 12 and 22. At this time, the first and second sensor parts 12 and 22 may have a minimum thickness when metal nano-wires having a network structure are included. For example, the first and second sensor parts 12 and 22 may have a thickness within a range from 50 nm to 350 nm. This is because this thickness range ensures the easy fabrication of the first and second sensor parts 12 and 22 having a desired resistance. However, the present disclosure is not limited thereto, and, for example, the thickness of the first and second sensor parts 12 and 22 may have any of various values. As described above, in the present embodiment, the first and second sensor parts 12 and 22 include the nano material conductors 12a forming a network structure, which may reduce material costs and improve various properties.

In addition, in the non-active area NA, the first wiring part 14 is connected to the first sensor part 12, and the second wiring part 24 is connected to the second sensor part 22. The flexible printed circuit board 30 may be connected or attached to the first and second wiring parts 14 and 24. In the present embodiment, the two first and second wiring parts 14 and 24 may be connected to the single flexible printed circuit board 30. This is because the first and second sensor parts 12 and 22 are disposed over the same surface of the conductive film 110 (i.e. over one surface the base film 112, more particularly, on the first hard coating layer 114). The configuration or shape of the first electrode 10 including the first sensor part 12 and the first wiring part 14 and the second electrode 20 including the first sensor part 22 and the second wiring part 24 will be described later in detail.

The first and second wiring parts 14 and 24 may be connected to the flexible printed circuit board 30 for external connection. The flexible printed circuit board 30 may include a base member and a wiring part formed on the base member. As the wiring part of the flexible printed circuit board 30 and the first and second wiring parts 14 and 24 come into contact with each other, the first and second wiring parts 14 and 24 and the flexible printed circuit board 30 may be electrically connected to each other. However, the present disclosure is not limited thereto, and a conductive adhesive member (not illustrated) such as, for example, an anisotropic conductive adhesive (ACA), an anisotropic conductive paste (ACP), or an anisotropic conductive film (ACF) may be located between the wiring part of the flexible printed circuit board 30 and the first and second wiring parts 14 and 24 so as to electrically connect the same to each other. Although FIG. 1 illustrates that the first and second wiring parts 14 and 24 and the flexible printed circuit board 30 connected thereto are located at one side of the active area AA, the present disclosure is not limited thereto, and the first and second wiring parts 14 and 24 and the flexible printed circuit board 30 may have any of various arrangements.

The over-coating layer 116, which is disposed on one surface of the base film 112 to cover the base film 112 and the first and second sensor parts 12 and 22, serves to physically and chemically protect the first and second sensor parts 12 and 22. More specifically, the over-coating layer 116 may enclose the outer surfaces of the conductors 12a, which extend out of the residual portion 12b, in order to prevent damage to the conductors 12a or oxidation of the conductors 12a. More specifically, the over-coating layer 116 may physically protect the conductors 12a, which protrude upward from the residual portion 12b, in order to prevent the conductors 12a from bending by, for example, external force. In addition, because the conductors 12a may be oxidized when exposed to outside air for a long time, thus exhibiting reduced electrical conductivity, the over-coating layer 116 may be formed so as to cover the conductors 12a in order to prevent the above-described problem. In the present embodiment, in consideration of the fact that the first and second sensor parts 12 and 22 include the nano-material conductors 12a forming a network structure, the over-coating layer 116 capable of improving the physical stability of the conductors 12a and preventing oxidation of the conductors 12a is provided. For example, a portion of the over-coating layer 116 may be introduced into voids between the conductors 12a to fill the voids, and the remaining portion of the over-coating layer 116 may be present above the conductors 12a. Unlike the present embodiment, even in the case where the conductors 12a are included in the residual portion 12b rather than protruding upward from the residual portion 12b, the over-coating layer 116 may prevent the conductors 12a from being oxidized by, for example, outside air introduced into the residual portion 12b. To this end, the over-coating layer 116 may be formed so as to directly come into contact with the first and second sensor parts 12 and 22 or the conductors 12a.

The over-coating layer 116 may be formed on the base film 112 throughout the active area AA so as to cover the first and second sensor parts 12 and 22. Here, the term "throughout the active area AA" may refer not only to complete formation without empty regions of the active area AA, but also to formation with inevitable omission of some portions of the active area AA.

The over-coating layer 116 described above may be formed of a resin. For example, the over-coating layer 116 may be formed of an acrylic resin. However, the present disclosure is not limited thereto, and the over-coating layer 116 may be formed of any of various other materials. In addition, the over-coating layer 116 may be formed to cover the entire first and second sensor parts 12 and 22 via any of various coating methods.

The thickness of the over-coating layer 116 may be, for example, within a range from 5 nm to 50 nm. When the thickness of the over-coating layer 116 is below 5 nm, the over-coating layer 116 may fail to sufficiently prevent oxidation of the conductors 12a. When the thickness of the over-coating layer 116 exceeds 50 nm, material costs may increase. However, the present disclosure is not limited thereto and the thickness of the over-coating layer 116 may vary to various other values.

The drawings and the above-described embodiment illustrate that the residual portion 12b of the first and second sensor parts 12 and 22 and the over-coating layer 116 are configured as different layers. However, the present disclosure is not limited thereto. In another embodiment, by applying, for example, ink that is a mixture of constituent materials of the conductors 12a and the residual portion 12b of the first and second sensor parts 12 and 22 and the over-coating layer 116 described above, the conductors 12a may be included in the single over-coating layer 116. Of course, various other alterations are possible.

Next, the first hard coating layer 114 located between the base film 112 and the first and second electrodes 10 and 20 will again be described. As described above, in the present embodiment, because the conductors 12a of the first and second sensor parts 12 and 22 are formed of nano materials having a network structure, the conductive film 110 or a structure for forming the same may be easily damaged by external force during movement for coating. That is, in the present embodiment, even if a small external force is applied to the conductive film 110, this has an effect on the contact characteristics between the nano materials (for example, nano wires) that form a network structure, which may vary the electrical conductivity of the first and second sensor parts 12 and 22. Accordingly, in the present embodiment, the first hard coating layer 114, which has a relatively high hardness (i.e. a higher hardness than the first electrode 10 and the over-coating layer 116) may be located between the base film 112 and the first electrode 10 (more particularly, the first and second sensor parts 12 and 22), so as to increase the hardness of the entire conductive film 110. In this way, even if external force is applied to the conductive film 110, the conductors 12a inside the first and second sensor parts 12 and 22 may maintain enhanced contact characteristics.

In addition, the base film 112 has an uneven upper surface having a relatively high surface roughness. This uneven surface of the base film 112 may increase diffuse reflections. At this time, in the case where the conductors 12a having a network structure are applied in the present embodiment, the occurrence of diffuse reflections may be worsened by, for example, the network structure, which may increase haze (turbidity) and deteriorate light transmissivity. In addition, in the case where the first and second sensor parts 12 and 22 are formed on the rough surface of the base film 112 described above, it is difficult to impart a constant thickness to the first and second sensor parts 12 and 22 formed of nano materials having a network structure. Consequently, there may occur a non-coated region and the first and second sensor parts 12 and 22 may exhibit increased deviation in sheet resistance.

In the present embodiment, in consideration of the above-described problems, the first hard coating layer 114 is applied to the entire base film 112 for planarization of the upper surface of the base film 112. That is, the upper surface of the first hard coating layer 114 may have a lower surface roughness than that of the upper surface of the base film 112 (or the lower surface of the first hard coating layer 114). Planarization of the surface of the base film 112 by the first hard coating layer 114 may minimize haze and diffuse reflections and maximize light transmissivity. Consequently, the optical characteristics of the conductive film 110 may be improved. In addition, the coating characteristics of the first and second electrodes 10 and 20 (for example, the first and second sensor parts 12 and 22) may be improved. In this way, the deviation of various characteristics such as, for example, the sheet resistance and optical characteristics of the first and second sensor parts 12 and 22 may be minimized.

The first hard coating layer 114 may comprise various materials, which are capable of increasing the hardness and improving the coating characteristics of the first and second sensor parts 12 and 22. For example, the first hard coating layer 114 may comprise at least one of a urethane based resin, melamine based resin, alkyd based resin, epoxy based resin, acryl based resin, polyester based resin, polyvinyl alcohol based resin, vinyl chloride based resin, vinylidene chloride based resin, polyarylate based resin, sulfone based resin, amide based resin, imide based resin, polyether sulfone based resin, polyether imide based resin, polycarbonate based resin, silicon based resin, fluorine based resin, polyolefin based resin, styrene based resin, vinyl pyrrolidone based resin, cellulose based resin, acrylonitrile based resin and the like. In particular, in the present embodiment, the first hard coating layer 114 may include an acryl based resin. However, the present disclosure is not limited thereto, and the first hard coating layer 114 may be formed of any of various other materials.

The first hard coating layer 114 may have a pencil hardness of 1H to 5H. When the pencil hardness of the first hard coating layer 114 is below 1H, it may be difficult to sufficiently achieve the above-described effects. When the pencil hardness of the first hard coating layer 114 exceeds 5H, the manufacture of the first hard coating layer 114 may be difficult. In addition, the first hard coating layer 114 may have a water contact angle within a range from 40° to 60° and a surface tension within a range from 20 dyne/cm to 50 dyne/cm. The contact angle and surface tension of the first hard coating layer 114 may have lower values than the contact angle and surface tension of another layer (for example, the base film 112 or a primer layer (not illustrated) interposed between the base film 112 and the first hard coating layer 114). As such, the first and second sensor parts 12 and 22 may be easily formed on the first hard coating layer 114.

The thickness of the first hard coating layer 114 may be determined so as to enable the planarization of the surface of the conductive film 110 while increasing the hardness of the conductive film 110. To this end, the first hard coating layer 114 may have a greater thickness than those of the first and second sensor parts 12 and 22 and the over-coating layer 116. However, because the thickness of the conductive film 110 may unnecessarily increase when the thickness of the first hard coating layer 114 is excessively increased, the first hard coating layer 114 may have a smaller thickness than the thickness of the base film 112.

For example, the thickness of the first hard coating layer 114 may range from 1 μm to 10 μm. When the thickness of the first hard coating layer 114 is below 1 μm, it may be difficult to sufficiently achieve the effects of the first hard coating layer 114 described above. When the thickness of the first hard coating layer 114 exceeds 10 μm, the material costs increase and a reduction in thickness may be difficult. In sufficient consideration of the effects and thickness reduction of the first hard coating layer 114, the thickness of the first hard coating layer 114 may range from 3 μm to 5 μm. However, the present disclosure is not limited thereto, and the first hard coating layer 114 may have a different thickness.

Meanwhile, the second hard coating layer 118 may further be disposed on the other surface of the base film 112. The second hard coating layer 118 serves to protect the conductive film 110 from damage (e.g., scratches) that may be generated during processing. Various characteristics of the second hard coating layer 118 such as, for example, the material and thickness thereof may be identical to or extremely similar to those of the first hard coating layer 114, and thus a detailed description thereof will be omitted herein. As a result of providing both the first and second hard coating layers 114 and 118 described above, the conductive film 110 according to the present embodiment may have a pencil hardness of 2H or more (for example, within a range from 2H to 10H). However, the present disclosure is not limited thereto, and the second hard coating layer 118 may be omitted.

Although FIG. 2 illustrate one surface of the conductive film 110, on which the first and second electrodes 10 and 20 are formed, as being disposed so as to face the cover substrate 130. As such, the cover substrate 130 and the second hard coating layer 118 may configure both outer surfaces of the touch panel 100 so as to protect the touch panel 100 from external shocks. However, the present disclosure is not limited thereto, and one surface of the conductive film 110, on which the first and second electrodes 10 and 20 are formed, may configure one outer surface.

In the present embodiment, the first sensor part 12 of the first electrode 10 and the second sensor part 22 of the second electrode 20 may not cross each other on the same plane (or may not overlap each other in the plane) and may have a complementary shape. That is, the first sensor part 12 and the second sensor part 22 may be spaced apart from each other by a constant distance and may have opposite shapes. For example, in a region in which the first sensor part 12 has a concave portion, the second sensor part 22 may have a convex portion, such that the concave portion and the convex portion are spaced apart from each other by a consistent distance. The first and second sensor parts 12 and 22 described above may be formed at the same time in the same process, and thus may include the same conductors 12a. The first and second wiring parts 14 and 24 may have an improved structure so as to be suitable for the first and second sensor parts 12 and 22, and an insulation layer 119 may be provided in a region in which the first and second wiring parts 14 and 24 are arranged. This will be described below in detail with reference to FIG. 1 as well as FIGS. 3 to 8.

Figure 3:
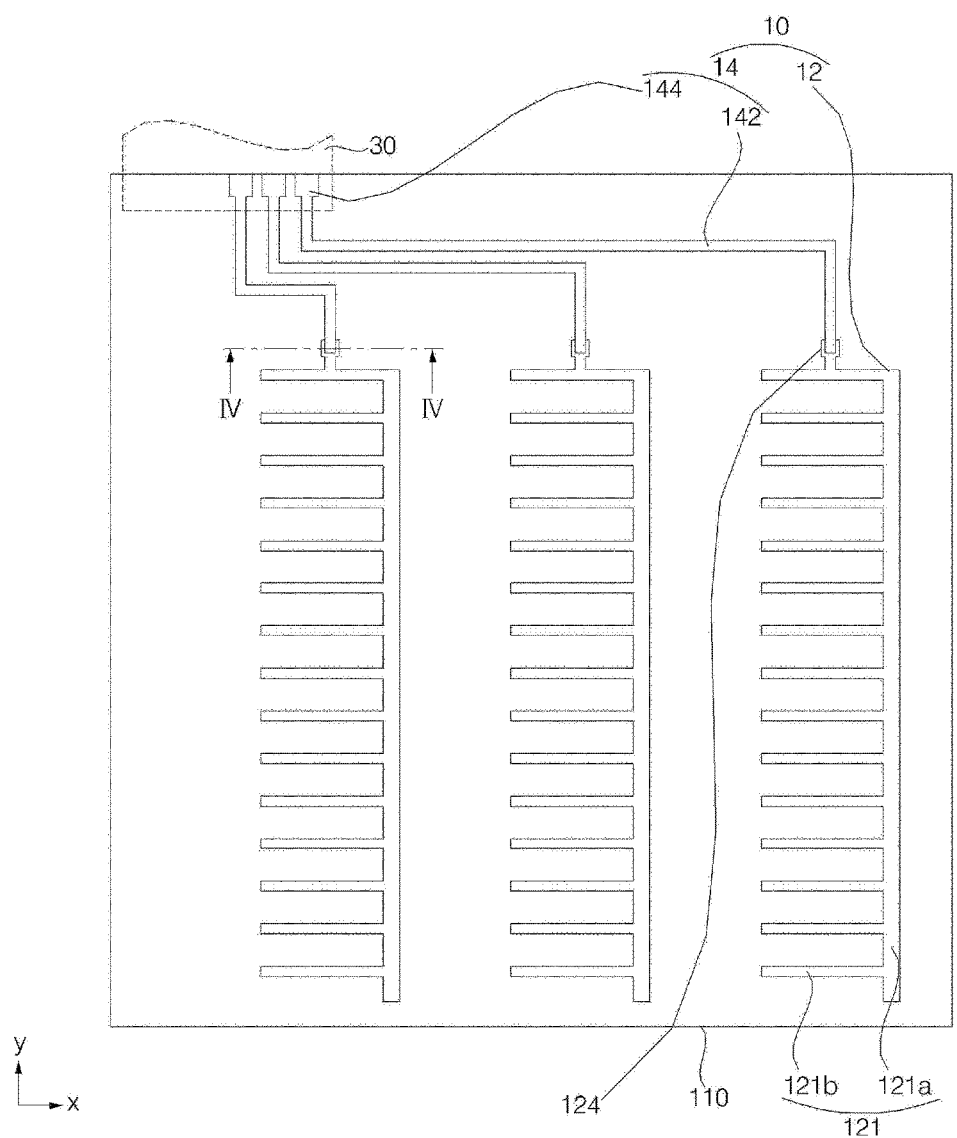
FIG. 3 is a plan view illustrating a first sensor part and a first wiring part in the touch panel illustrated in FIG. 1.
Figure 4:
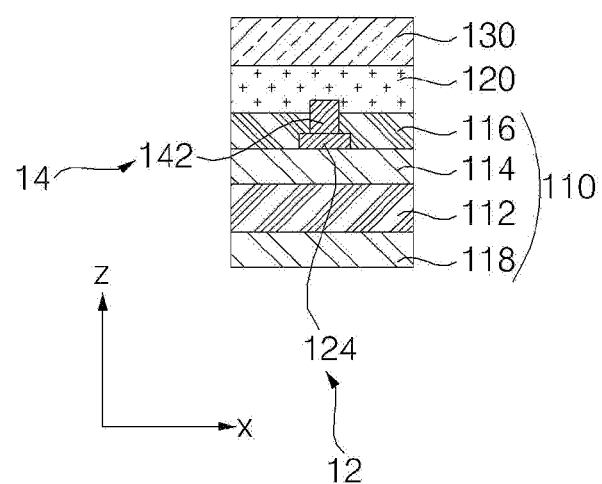
FIG. 4 is a sectional view taken along line IV-IV of FIG. 3.

First, the first electrode 10 will be described in detail with reference to FIGS. 1, 3 and 4. FIG. 3 is a plan view illustrating the first sensor part 12 and the first wiring part 14 in the touch panel 100 illustrated in FIG. 1, and FIG. 4 is a sectional view taken along line IV-IV of FIG. 3. For clear and brief illustration, in FIG. 3, the first hard coating layer 114, the over-coating layer 116, the second electrode 20, the insulation layer 119, the transparent adhesive layer 120, and the cover substrate 130 are not illustrated. In addition, in FIG. 3, the flexible printed circuit board 30 is illustrated by a dotted line.

Referring to FIGS. 1, 3 and 4, a plurality of first sensor parts 12 is spaced apart from one another in a first direction (in the x-axis of the drawings), and each sensor part 12 extends a long length in a second direction (in the y-axis of the drawings) crossing the first direction. In addition, a plurality of first wiring parts 14 is connected to the respective first sensor parts 12 so as to correspond to the first sensor parts 12. In one example, the first wiring parts 14 may correspond to the first sensor parts 12 in a one-to-one manner.

Each of the first sensor parts 12 may include one sensor portion 121 in the second direction. The sensor portion 121 of the first sensor part 12 may have any of various shapes in order to achieve complementary coupling with sensor portions 221, 222 and 223 of the second sensor part 22 so as to face each other over a sufficient area.

Figure 5:
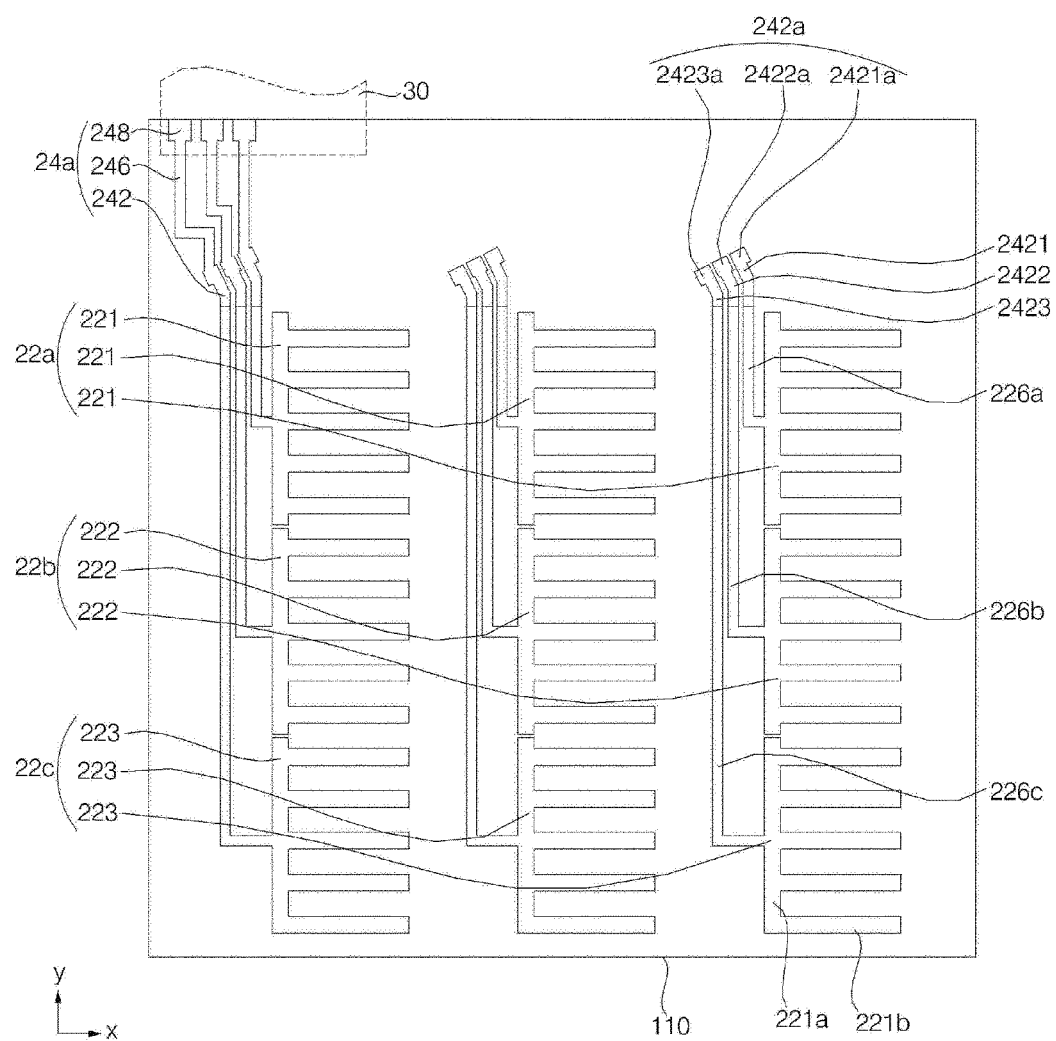
FIG. 5 is a plan view illustrating a second sensor part and a first part of the second wiring part in the touch panel illustrated in FIG. 1.

In the drawings, for example, the sensor portion 121 of the first sensor part 12 may include a single stem portion 121a, and a plurality of branch portions 121b protruding from the stem portion 121a in a given direction. In addition, as illustrated in FIG. 5, each sensor portion 221, 222 or 223 of the second sensor part 22 may include one stem portion 221a, and a plurality of branch portions 2221b each protruding from the stem portion 221a to a gap between the two branch portions 121b of the first sensor part 12. With this shape, one sensor portion 121 of the first sensor part 12 and the sensor portions 221, 222 and 223 of the second sensor part 22 may have a complementary shape and may be formed so as to face each other over a wide area. This may improve touch sensitivity.

Figure 8:
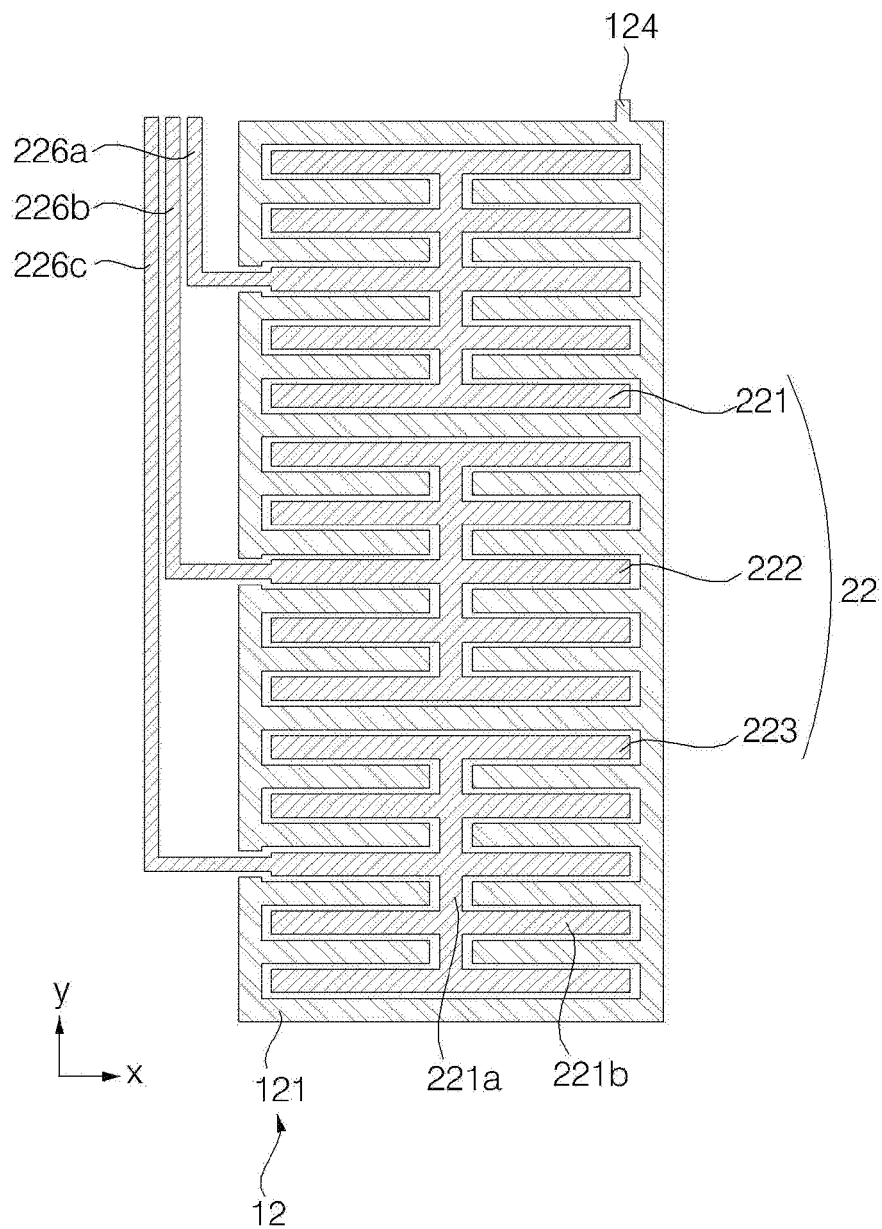
FIG. 8 is a plan view illustrating another example of the first and second sensor parts in the touch panel in accordance with the embodiment of the present disclosure.

However, the present disclosure is not limited thereto, and for example, the shape of the sensor portion 121 of the first sensor part 12 and the shape of the sensor portions 221, 222 and 223 of the second sensor part 22 may be altered in various ways. Another example of the shapes of the first sensor part 12 and the second sensor part 22 will be described below with reference to FIG. 8. FIG. 8 is a plan view illustrating another example of the first and second sensor parts 12 and 22 in the touch panel 100 in accordance with the embodiment of the present disclosure. For clear and brief illustration, in FIG. 8, only one first sensor part 12 and one second sensor part 22 are illustrated.

Referring to FIG. 8, each of the sensor portions 221, 222, or 223 of the second sensor part 22 may include the stem portion 221a, and the branch portions 221b protruding in opposite directions from the stem portion 221a so as to cross the stem portion 221a. At this time, the first sensor part 12 may generally have a rectangular shape, and may have an opening, which corresponds to the sensor portions 221, 222 and 223 and is slightly larger than the sensor portions 221, 222 and 223 and inner wirings 226a, 226b and 226c. Various other shapes of the first and second sensor parts 12 and 22 may be applied.

Referring again to FIGS. 1, 3 and 4, each of the first sensor parts 12 may further include an extending wiring 124, which extends from one sensor portion 121 to the first wiring part 14 located in the non-active area NA. In one example, the extending wiring 124 may correspond to one sensor portion 121 of the first sensor part 12 in a one-to-one manner so as to correspond to the first sensor part 12 or the sensor portion 121.

In the present embodiment, no over-coating layer 116 may be provided in a portion of the first wiring part 14, which is connected to the first sensor part 12. Alternatively, as illustrated in FIG. 4, the first wiring part 14 may be disposed on an exposed portion of the first sensor part 12 (i.e. the end of the first sensor part 12 or the extending wiring 124), from which the over-coating layer 116 has been removed. At this time, the first wiring part 14 may be formed so as to come into contact with the first sensor part 12. In a process of patterning the first sensor part 12, the over-coating layer 112, which has a small thickness and is located in a portion in which the first wiring part 14 will be located, may be easily removed. Alternatively, after a metal paste (e.g. silver paste) for forming the first wiring part 14 is applied, the over-coating layer 116 having a small thickness may be naturally removed in a firing process. However, the present disclosure is not limited thereto. Thus, the over-coating layer 116 may be removed by, for example, another patterning process. In addition, a portion of the first wiring part 14, which is connected to the first sensor part 12, may be disposed on the same plane as the first sensor part 12, such that the corresponding portion of the first wiring part 14 may come into contact with the side surface of the first sensor part 12. Alternatively, the first wiring part 14 may be disposed over the first sensor part 12 with the over-coating layer 116 interposed therebetween, whereby the first wiring part 14 and the first sensor part 12 may be electrically connected to each other. Various other alterations are possible.

More specifically, the first wiring part 14 may include a wiring 142 extending from the first sensor part 12, and a pad 144 connected to the wiring 142 and also connected to the flexible printed circuit board 30. The wiring 142 may have a relatively small width so as to minimize the size of the non-active area NA, and the pad 144 may have a width greater than that of the wiring 142 so as to improve connection with the flexible printed circuit board 30. At this time, the first wiring part 14 may include a portion disposed on the same plane as the first sensor part 12. In the present embodiment, at least a portion of the wiring 142 and the pad 144 of the first wiring part 14 are disposed on the same plane as the first sensor part 12. Thereby, the first wiring part 14 and the first sensor part 12 may be stably connected to each other with a simplified structure. However, the present disclosure is not limited thereto, and the first wiring part 14 may have any of various shapes, or may be formed at any of various positions.

The first wiring part 14 may be formed of a material different from that of the first sensor part 12, or may have a structure different from that of the first sensor part 12. More specifically, the entire first wiring part 14 may be filled with metal particles, which are densely arranged in contact with one another at a higher filling density than in the first sensor part 12. As such, the main component (i.e. the material included in the greatest amount, or the material included in an amount of 50 wt % or more) of the first wiring part 14 may be a metal that is densely provided, and, for example, may be silver (Ag). However, the present disclosure is not limited thereto, and the wiring part 14 may be formed of any of various conductive materials. For example, although the present embodiment illustrates the first sensor part 12 and the first wiring part 14 having different structures, the first wiring part 14 and the first sensor part 12 may have an integrated structure formed of the same material. In this case, the first wiring part 14 and the first sensor part 12 may include the nano-material conductors 12a. Hence, the first sensor part 12 and the first wiring part 14 may be formed via a simplified manufacturing process. In this case, the entire first wiring part 14 and the first sensor part 12 may be disposed on the same plane, and the over-coating layer 116 may be formed so as to cover both the first sensor part 12 and the first wiring part 14.

The first wiring part 14 may be formed via any of various methods. In one example, the first wiring part 14 may be formed by applying (e.g. printing) a metal paste (e.g. silver paste) and then firing the same. The first wiring part 14 may be applied in a patterned state, or may be patterned via a photosensitive process, a developing process, or an etching process after being wholly applied. With this method, the first wiring part 14 having a desired pattern may be easily manufactured. However, the present disclosure is not limited as to the method of manufacturing the first wiring part 14.

Figure 6:
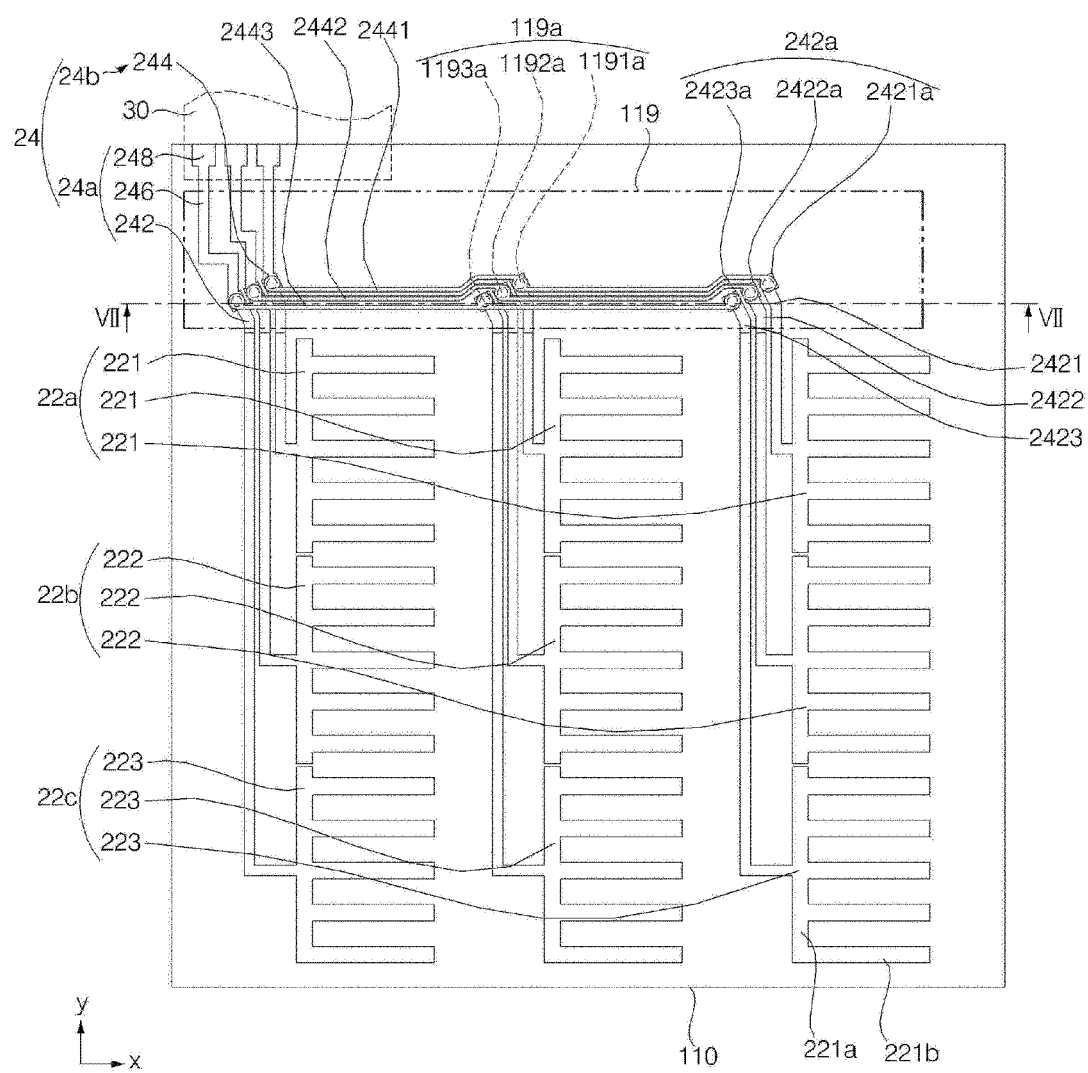
FIG. 6 is a plan view illustrating a second sensor part and first and second parts of the second wiring part in the touch panel illustrated in FIG. 1.
Figure 7:
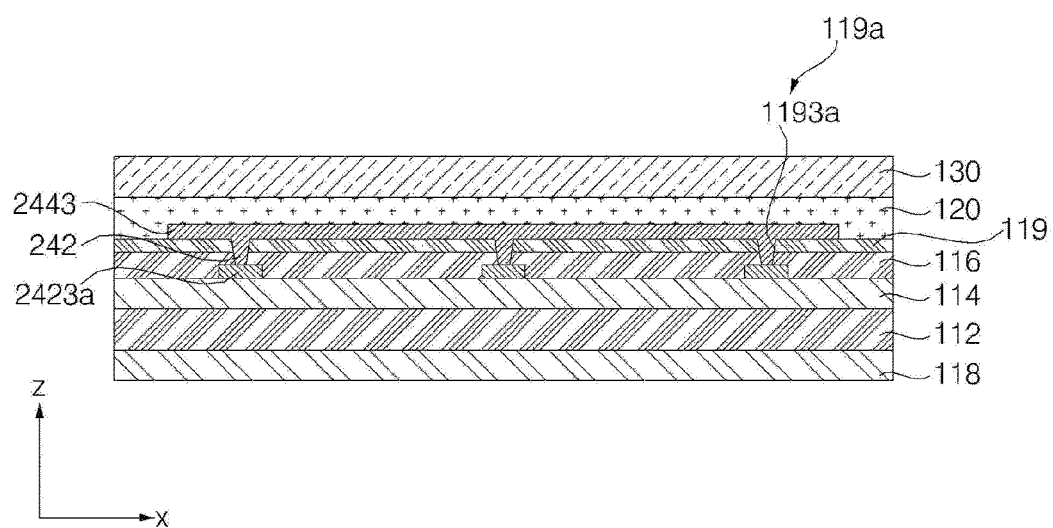
FIG. 7 is a sectional view taken along line VII-VII of FIG. 6.

In addition, the second electrode 20 will be described below in detail with reference to FIGS. 1 and 5 to 7. FIG. 5 is a plan view illustrating the second sensor part 22 and a first part 24a of the second wiring part 24 in the touch panel 100 illustrated in FIG. 1, and FIG. 6 is a plan view illustrating the second sensor part 22 and first and second parts 24a and 24b of the second wiring part 24 in the touch panel 100 illustrated in FIG. 1. FIG. 7 is a sectional view taken along line VII-VII of FIG. 6. For clear and brief illustration, in FIG. 5, the first hard coating layer 114, the over-coating layer 116, the first electrode 10, the second part 24b of the second wiring part 24, the insulation layer 119, the transparent adhesive layer 120, and the cover substrate 130 are not illustrated, and in FIG. 6, the first hard coating layer 114, the over-coating layer 116, the first electrode 10, the transparent adhesive layer 120, and the cover substrate 130 are not illustrated. In addition, in FIGS. 5 and 6, the flexible printed circuit board 30 and the insulation layer 119 are illustrated respectively by a dotted line and a dashed line.

Referring to FIGS. 1 and 5 to 7, the second sensor part 22 includes the sensor portions 221, 222 and 223, which are adjacent to the sensor portion 121 of the first sensor part 12 and have a complementary shape. At this time, the first sensor part 12 and the second sensor part 22 may correspond to each other in a one-to-one manner, and the second sensor parts 22 may be spaced apart from one another in the first direction (in the x-axis of the drawings). In addition, each second sensor part 22 may include the sensor portions 221, 222 and 223, which are spaced apart from one another in the second direction, rather than extending a long length in the second direction, unlike the first sensor part 12.

More specifically, the sensor portions 221, 222 and 223 include a first sensor portion 221 located at a first position in the second direction, and a second sensor portion 222 located at a second position, which is different from the first position, in the second direction. The drawings illustrate an additional third sensor portion 223 located at a third position, which is different from the first and second positions. In the specification, the sensor portions 221, 222 and 223 have been described as including three sensor portions, i.e. the first to third sensor portions 221, 222 and 223 by way of example. This is merely given for clear description and the present disclosure is not limited thereto. Thus, it may be sufficient that the second sensor part 22 includes two or more sensor portions 221, 222 and 223, which are formed at different positions in the second direction and are spaced apart from one another.

At this time, the sensor portions 221, 222 or 223, which are located in the second sensor parts 22 at the same position in the second direction, may form sensor groups 22a, 22b or 22c respectively. For example, the first sensor portions 221 of the second sensor parts 22 may form a first sensor group 22a located at the first position, the second sensor portions 222 of the second sensor parts 22 may form a second sensor group 22b located at the second position, and the third sensor portions 223 of the second sensor parts 22 may form a third sensor group 22c located at the third position. The sensor portions 221, 222 and 223, which form the sensor groups 22a, 22b and 22c respectively, are electrically connected to one another by the second wiring part 24, thereby functioning like a single electrode. Thereby, the sensor groups 22a, 22b and 22c of the second electrode 20 are formed in the first direction, which crosses with the first sensor part 12 of the first electrode 10 extending in the second direction. In this way, a touch region may be sensed by the first sensor part 12 and the sensor groups 22a, 22b and 22c, which are arranged so as to cross each other.

One example of the shape of the respective sensor portions 221, 222 and 223 has been described above, and thus, a detailed description thereof will be omitted below. The shape of the sensor portions 221, 222 and 223 of the second sensor part 22 is not limited to a specific shape, and may be sufficient to have a shape complementary to the shape of the sensor portion 121 of the first sensor part 12.

Each second sensor part 22 may further include the extending wirings 226a, 226b and 226c, which extend from the sensor portions 221, 222 and 223 to the second wiring part 24 located in the non-active area NA so as to correspond to the sensor portions 221, 222 and 223 in a one-to-one manner. The extending wirings 226a, 226b and 226c may extend from one side of the second sensor part 22 and may be spaced apart from one another by a constant distance. In the entire touch panel 100, the extending wirings 226a, 226b and 226c may be provided in the same number as the total number of the sensor portions 221, 222 and 223 included in the second sensor parts 22.

The second wiring part 24 may include a first part 24a disposed on the same plane as the second sensor part 22, and a second part 24b disposed on a layer different from the second sensor part 22. That is, the first part 24a may include a portion disposed parallel to the second sensor part 22 over one surface of the base film 112 (more accurately, over the first hard coating layer 114). In addition, the second part 24b may be spaced apart from the second sensor part 22 or the first part 24a with the insulation layer 119 interposed therebetween, and may be connected to the first part 24a in a contact hole 119a.

In the present embodiment, the second wiring part 24 may include an extension portion 242 electrically connected to (e.g. in contact with) the second sensor part 22, a connection portion 244 for interconnecting the sensor portions 221, 222 and 223 located to correspond to one another in the second direction, a wiring 246 extending from the extension portion 242 or the connection portion 244 to a pad 248, and the pad 248 connected to the wiring 246 and also connected to the flexible printed circuit board 30. At this time, the drawing illustrates that the first part 24a includes the extension portion 242, the wiring 246, and the pad 248, and the second part 24b includes the connection portion 244 connected to (e.g. in contact with) the extension portion 242 by way of example. However, the present disclosure is not limited thereto, and at least a portion of at least one of the extension portion 242, the wiring 246, and the pad 248 may configure at least a portion of the second part 24b. Various other alterations are possible.

A plurality of extension portions 242, which is electrically connected to the second sensor part 22, is connected to the respective sensor portions 221, 222 and 223 so as to correspond to the sensor portions 221, 222 and 223, which correspond to the second sensor parts 22. That is, the extension portions 242 may correspond in a one-to-one manner to all of the sensor portions 221, 222 and 223 included in the second sensor parts 22. For example, in the case where three second sensor parts 22 are provided and one second sensor part 22 includes the first to third sensor portions 221, 222 and 223, nine extension portions 242 may be provided so as to correspond to the sensor portions in a one-to-one manner.

In the drawings, for brief illustration, the extension portion 242 comes into contact with the side surface of the second sensor part 22. However, this is merely given for brief illustration and the present disclosure is not limited thereto. The over-coating layer 116 may not be formed on the extension portion 242, or may be removed from the extension portion 242 in the present embodiment, similar to the wiring 246 of the first wiring part 14 illustrated in FIG. 4. Thereby, the extension portion 242 may be disposed over an exposed portion of the second sensor part 22 (e.g. the end of the second sensor part 22 or the extending wiring 226a, 226b or 226c). At this time, the extension portion 242 may be formed in contact with the second sensor part 22. In a process of patterning the second sensor part 22, the over-coating layer 116, which is located in a portion in which the first wiring part 24 will be located and has a small thickness, may be easily removed. Alternatively, after a metal paste (e.g. silver paste) for forming the extension portion 242 is applied, the over-coating layer 116 having a small thickness may be naturally removed in a firing process. However, the present disclosure is not limited thereto. Thus, the over-coating layer 116 may be removed by, for example, another patterning process. In addition, the extension portion 242 may be disposed on the same plane as the second sensor part 22, such that the extension portion 242 may come into contact with the side surface of the second sensor part 22. Alternatively, the extension portion 242 may be disposed over the second sensor part 22 with the over-coating layer 116 interposed therebetween, whereby the extension portion 242 and the second sensor part 22 may be electrically connected to each other. Various other alterations are possible.

In the present embodiment, a pad portion 242a may be located on the end of the extension portion 242 (i.e. the end opposite to the end connected to the second sensor part 22), and may have a greater area or a greater width than that of the remaining portion. For example, a first pad portion 2421a may be located on the end of a first extension portion 2421 connected to the first sensor portion 221, a second pad portion 2422a may be located on the end of a second extension portion 2422 connected to the second sensor portion 222, and a third pad portion 2423a may be located on the end of a third extension portion 2423 connected to the third sensor portion 223. At this time, the pad portions 2421a, 2422a and 2423a, which are located to correspond to one another so as to simplify the structure of the connection portion 244 and correspond to the sensor portions 221, 222 and 223, may be located at the same position in the second direction. That is, the first pad portions 2421a corresponding to the respective first sensor portions 221 may be located at the same position in the second direction, the second pad portions 2422a corresponding to the respective second sensor portions 222 may be located at the same position in the second direction, and the third pad portions 2423a corresponding to the respective third sensor portions 223 may be located at the same position in the second direction.

For example, the pad portions 2421a, 2422a and 2423a, each of which is adjacent to a corresponding one of the sensor portions 221, 222 and 223 of each second sensor part 22, may be arranged in a direction, which is inclined relative to the first direction and the second direction. That is, first to third pad portions 2421a, 2422a and 2423a of first to third extension portions 2421, 2422 and 2423, connected to the first to third sensor portions 221, 222 and 223 of each second sensor part 22, may be arranged in the direction inclined relative to the first direction and the second direction. Thereby, even when the sensor portions 221, 222 and 223 are located, the pad portions 2421a, 2422a and 2423a, which have a relatively great area or great width, may be densely arranged. On the other hand, when the pad portions 2421a, 2422a and 2423a are arranged parallel to the first direction, the wiring 246 or the connection portion 244 needs to be curved plural times in order to reach the pad portions 2421a, 2422a and 2423a, which may deteriorate the degree of freedom in circuit design. In addition, when the pad portions 2421a, 2422a and 2423a are arranged parallel to the second direction, the area of the non-active area NA may increase in order to arrange the pad portions 2421a, 2422a and 2423a in the second direction.

The connection portion 244 connects the extension portions 242, which are connected to the corresponding sensor portions 221, 222 and 223 at the same position, to one another so as to form the sensor groups 22a, 22b and 22c. At this time, the connection portion 244 may be disposed on the insulation layer 119 formed over the extension portions 242, and may be connected to the extension portion 242 through the contact hole 119a formed in the insulation layer 119. For example, the contact hole 119a may be located in a portion of the insulation layer 119 corresponding to the pad portion 242a of the extension portion 242.

More specifically, a plurality of connection portions 244 is connected to the respective sensor portions 221, 222 and 223 so as to correspond to the sensor portions 221, 222 and 223, which correspond to each second sensor part 22. That is, the connection portions 244 of the second wiring part 24 may correspond in a one-to-one manner to all of the sensor portions 221, 222 and 223 included in each second sensor part 22. For example, in the case where one second sensor part 22 includes the first to third sensor portions 221, 222 and 223, three connection portion 244 may be provided so as to correspond to the sensor portions in a one-to-one manner.

More specifically, the connection portions 244 may include a first connection portion 2441, which connects the first sensor portions 221 of the second sensor parts 22 to one another in a first direction so as to form the first sensor group 22a, a second connection portion 2442, which connects the second sensor portions 222 of the second sensor parts 22 to one another in a second direction so as to form the second sensor group 22b, and a third connection portion 2443, which connects the third sensor portions 223 of the second sensor parts 22 to one another in a third direction so as to form the third sensor group 22a.

The extension portions 242, which correspond in a one-to-one manner to the sensor portions 221, 222 and 223 included in the second sensor parts 22, may be connected to one another by the connection portions 244. Hence, the connection portions 244 may be provided in the same number as the sensor portions 221, 222 and 223 included in each second sensor part 22 so as to correspond to each other in a one-to-one manner.

In the present embodiment, the insulation layer 119 may be performed in a portion in which the connection portion 244 and the first wiring part 14, which need to be spaced apart from each other, overlap each other. Thereby, material costs may be reduced and the thickness of the touch panel 100 may be minimized.

The insulation layer 119 may be formed of any of various materials capable of maintaining insulation. At this time, the insulation layer 119 may include a resin as a main component. Thereby, the insulation layer 119 may be formed only in a desired portion by a simplified process such as, for example, printing. In addition, the insulation layer 119 may maintain excellent flexibility. For example, the insulation layer 119 may be formed of an acryl resin or urethane resin. However, the present disclosure is not limited as to the material of the insulation layer 119.

The insulation layer 119 may include a plurality of contact holes 119a at positions at which the extensions 242 and the connection portions 244 overlap each other. More specifically, a first contact hole 1191a may be located at a position corresponding to the first pad portion 2421a, a second contact hole 1192a may be located at a position corresponding to the second pad portion 2422a, and a third contact hole 1193a may be located at a position corresponding to the third pad portion 2423a. Thereby, for example, a plurality of first contact holes 1191a corresponding to the first pad portions 2421a may be located at the same position in the second direction, a plurality of second contact holes 1192a corresponding to the second pad portions 2422a may be located at the same position in the second direction, and a plurality of third contact holes 1193a corresponding to the third pad portions 2423a may be located at the same position in the second direction. In addition, for example, the first to third contact holes 1191a, 1192a and 1193a corresponding to each second sensor part 22 may be arranged in a direction, which is inclined relative to the first direction and the second direction. The insulation layer 119 having the contact holes 119a may be formed, or the contact holes 119a may be formed in a separate process after the entire insulation layer 119 is formed.

As illustrated in FIG. 7, a plurality of third contact holes 1193a, formed over the third pad portions 2423a of the second sensor parts 22, may be filled with the third connection portion 2443, which extends a long length over the insulation layer 119 while being electrically connected to (e.g. in contact with) the third pad portions 2423a. Hence, the third connection portion 2443 may connect the third pad portions 2423a to one another through the third contact holes 1193a. Although FIG. 7 illustrates the third connection portion 2443, the first and second connection portions 2441 and 2442 may connect the first or second pad portions 2421a or 2422a to one another in the same manner.

FIG. 7 illustrates that the over-coating layer 116 is present under the insulation layer 119 (i.e. between the first hard coating layer 114 and the insulation layer 119) in the non-active area NA so that the contact hole 119a of the insulation layer 119 is formed to the over-coating layer 116. However, the present disclosure is not limited thereto, and thus no over-coating layer 116 may be provided in the non-active area NA. Even if the over-coating layer 116 is present, the contact hole 119a may not extend to the over-coating layer 116.

For example, at least some of the connection portions 244 (i.e. the second connection portion 2442 and the third connection portion 2443 in the drawing) may be curved at a position adjacent to the contact hole 119a. Thereby, a portion of the connection portion 244 connected to the contact hole 119a and a portion of the connection portion 244 located between the contact holes 119a may be stepped, and a portion of the connection portion 244 adjacent to the contact hole 119a may be inclined. Thereby, the area of gaps between the connection portions 244 may be minimized, and consequently, the area of the non-active area NA may be minimized.

The wiring 246 may extend between the extension portion 242 or the connection portion 244 and the pad 248. In addition, the pad 248 is a portion that is connected to the wiring 246 and to the flexible printed circuit board 30. The wiring 246 may have a relatively small width, thus minimizing the size of the non-active area NA, and the pad 248 may have a width greater than that of the wiring 246, thus improving connection with the flexible printed circuit board 30.

At this time, the wiring 246 and the pad 248 of the second wiring part 14 may be disposed on the same plane as the second sensor part 22, thereby being disposed on the same plane as the wiring 142 and the pad 144 of the first wiring part 14. Hence, the pad 248 of the first electrode 10 and the pad 144 of the second electrode 20, which are connected to the flexible printed circuit board 30, may be disposed on the same plane to thereby be stably connected to the flexible printed circuit board 30. However, the present disclosure is not limited thereto.

One extension portion 242 or connection portion 244 may be connected to one wiring 246 and one pad 248. Thereby, the wiring 246 and the pad 248, which are connected to the extension portion 242 or the connection portion 244, may correspond to the sensor portions 221, 222 and 223 included in each sensor part 22. More specifically, one wiring 246 and one pad 248 may be provided so as to correspond to all of the first sensor portions 221, one wiring 246 and one pad 248 may be provided so as to correspond to all of the second sensor portions 222, and one wiring 246 and one pad 248 may be provided so as to correspond to all of the third sensor portions 223. For example, when each second sensor part 22 includes three sensor portions 221, 222 and 223, three wirings 246 and three pads 248 are provided.

As described above, according to the present embodiment, the number of each of the wirings 246 and the pads 248 may be less than the number of all of the sensor portions 221, 222 or 223 of the second sensor parts 22. Thereby, the number of each of the wirings 246 and the pads 248 may be minimized, which may minimize the size of the non-active area NA in which the wirings 246 and the pads 248 are arranged. On the other hand, in the related art, wirings or pads are provided so as to correspond to all sensor portions of a plurality of second sensor parts in a one-to-one manner. For example, when three second sensor parts are provided and each second sensor part includes three sensor portions, nine wirings and nine pads are provided.

The first part 24a and/or the second part 24b of the second wiring part 24 may be formed of a material different from that of the second sensor part 22, or may have a structure different from that of the second sensor part 22. In particular, the second part 24b, which is spaced apart from the second sensor part 22 with the insulation layer 119 interposed therebetween and is located on a layer different from the first part 24a, may be formed of a material different from that of the second sensor part 22, or may have a structure different from that of the second sensor part 22. For example, the entire first part 24a and/or the entire second part 24b may be filled with metal particles densely arranged in contact with one another at a higher filling density than that in the second sensor part 22. As such, the main component of the second wiring part 24 may be a metal that is densely provided, and, for example, may be silver (Ag). However, the present disclosure is not limited thereto, and the first part 24a and/or the second part 24b of the second wiring part 24 may be formed of any of various conductive materials. For example, although the present embodiment illustrates the second sensor part 22 and the second wiring part 24 having different structures, the first part 24a of the second wiring part 24 and the second sensor part 22 may have an integrated structure formed of the same material. In this case, the first part 24a of the second wiring part 24 and the second sensor part 22 may include the nano-material conductors 12a. Hence, the second sensor part 22 and the first part 24a of the second wiring part 24 may be formed via a simplified manufacturing process. In this case, the first part 24a of the second wiring part 24 is not disposed over the second sensor part 22. That is, the first part 24a of the second wiring part 24 and the second sensor part 22 may be disposed on the same plane over the base film 112 (more specifically, over the first hard coating layer 114), and the over-coating layer 116 may be formed so as to cover both the second sensor part 22 and the first part 24a of the second wiring part 24.

The first part 24a and the second part 24b of the second wiring part 24 may be formed by different processes. For example, after the first part 24a is formed and the insulation layer 119 having the contact hole 119a is formed, the second part 24b may be formed. The first part 24a and/or the second part 24b of the second wiring part 24 may be formed by various methods. For example, the first part 24a and/or the second part 24b of the second wiring part 24 may be formed by applying (e.g. printing) a metal paste (e.g. silver paste) and then firing the same. The first part 24a and/or the second part 24b of the second wiring part 24 may be applied in a patterned state, or may be patterned via a photosensitive process, a developing process, or an etching process after being wholly applied. With this method, the second wiring part 24 having a desired pattern may be easily manufactured. However, the present disclosure is not limited as to the method of manufacturing the second wiring part 24. At this time, the first wiring part 14 and the first part 24a of the second wiring part 24 may be formed at the same time in the same process by using the same material.

With the touch panel 100 according to the present embodiment, the first sensor part 12 and the second sensor part 22 may be arranged on the same plane over the same conductive film 110 so as to simplify the structure thereof. Thereby, the number of conductive films may be reduced and an adhesive layer for bonding the conductive films may be omitted. In this way, the thickness of the touch panel 100 may be minimized, and the touch panel 100 may be manufactured at low cost via a simplified process.

In particular, in the touch panel 100, a structure of the first and second wiring parts 14 and 24 for connecting the first and second sensor parts 12 and 22 to the flexible printed circuit board 30 may be further simplified. In particular, the number of pads 144 and 248 may be minimized. The area of the non-active area NA in which the pads 248 of the second wiring part 24 are arranged may be considerably reduced. Thereby, the touch panel 100 may have a narrow bezel.

Hereinafter, a touch panel according to another embodiment of the present disclosure and a display apparatus including the touch panel according to the present disclosure will be described in detail. A detailed description related to contents that are the same as or similar to the above-described contents will be omitted and only contents that are difference will be described below in detail. The above-described embodiments and modifications that may be applied thereto as well as following embodiments and modifications that may be applied thereto may be combined with one another in various ways.

Figure 9:
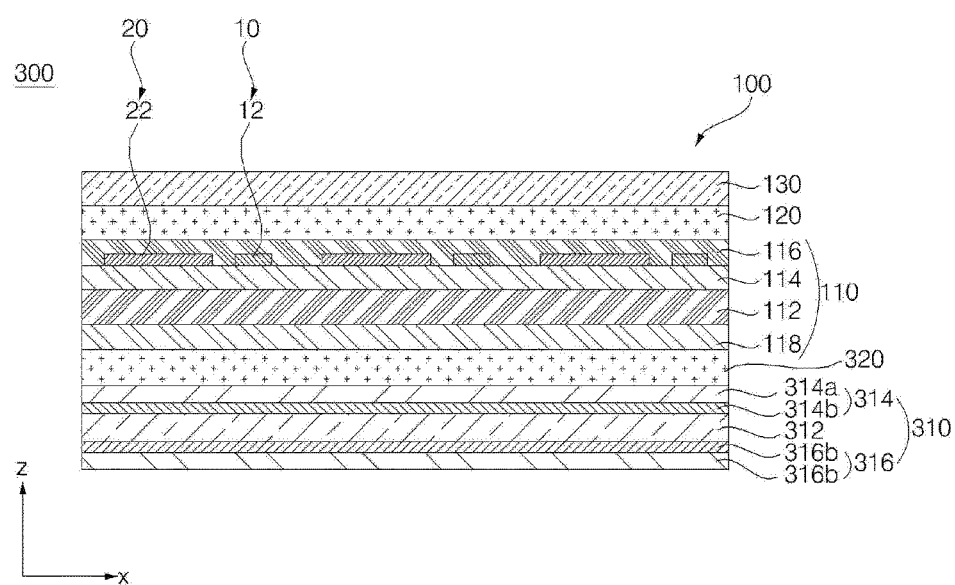
FIG. 9 is a sectional view illustrating a display apparatus according to one embodiment of the present disclosure.

FIG. 9 is a sectional view illustrating a display apparatus according to one embodiment of the present disclosure. Referring to FIG. 9, the display apparatus according to the present embodiment, designated by reference numeral 300, may include a display panel unit 310 and the touch panel 100 integrated with the display panel 310. The display panel unit 310 may include a display panel 312, which substantially displays an image, a front substrate 314 disposed on the front surface of the display panel 312, and a rear substrate 316 disposed on the rear surface of the display panel 312. The display panel unit 310 may further include, for example, a backlight unit for providing the display panel 312 with light, and a drive unit for driving the display panel 312.

The display panel 312 may be any one of various structures of panels which are capable of displaying an image. For example, the display panel 312 may be a liquid crystal display (LCD) panel. Because the display panel 312 may have any of various structures and be operated in various manners, the present disclosure is not limited thereto.

The front substrate 314 may include a transparent substrate 314a and a polarizer 314b attached to the top of the transparent substrate 314a (more specifically, to the inner surface of the transparent substrate 314a). The polarizer 314b serves to polarize light so as to display a desired image. The polarizer 314b may have any of various structures and be operated in various ways to polarize light. However, the present disclosure is not limited thereto, and various other films excluding the polarizer 314b may be disposed on the front substrate 314.

The rear substrate 316 may include a transparent substrate 316a and a polarizer 316b attached to the top of the transparent substrate 316a (more specifically, to the inner surface of the transparent substrate 316a). The polarizer 316b serves to polarize light so as to display a desired image. The polarizer 316b may have any of various structures and be operated in various ways to polarize light. However, the present disclosure is not limited thereto, and various other films excluding the polarizer 316b may be disposed on the front substrate 316.

In the present embodiment, the touch panel 100 is disposed on the entire front surface of the display panel unit 310, and an adhesive layer 320 is interposed between the touch panel 100 and the display panel unit 310 to attach the same to each other. As the conductive film 110 of the touch panel 100 and the adhesive layer 320 are disposed on the front substrate 314 of the display panel unit 310, the touch panel 100 may be integrated with the display panel unit 310 in an on-cell form. At this time, respective surfaces of the adhesive layer 320 may come into contact with the rear surface of the touch panel 100 and the front surface of the display panel unit 310.

Figure 10:
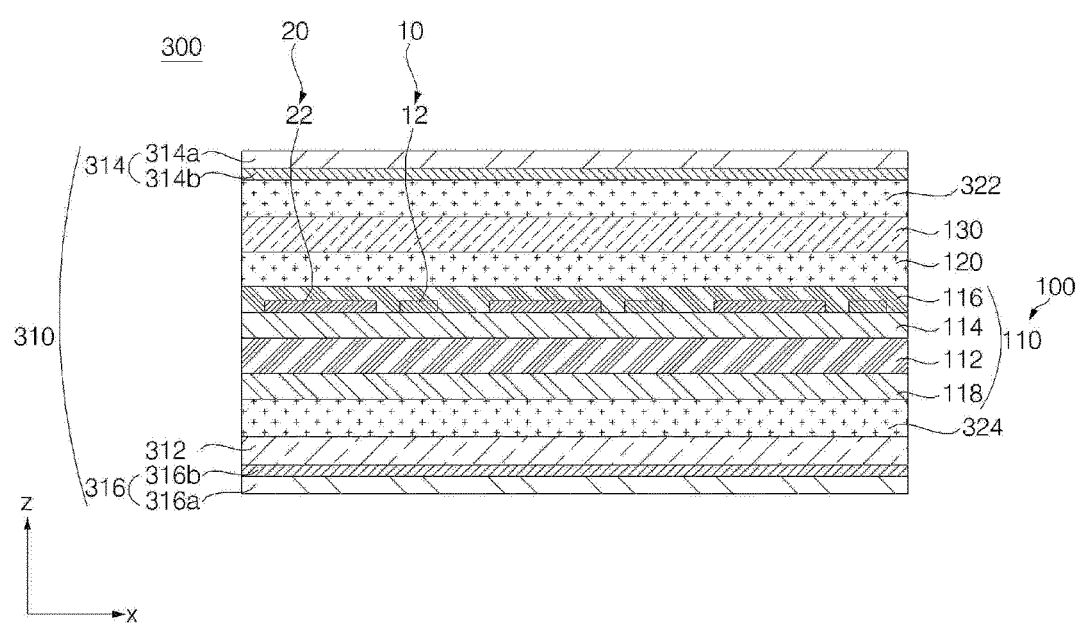
FIG. 10 is a sectional view illustrating a display apparatus according to another embodiment of the present disclosure.

FIG. 10 is a sectional view illustrating a display apparatus according to another embodiment of the present disclosure. Referring to FIG. 10, the display apparatus 300 according to the present embodiment may include the display panel unit 310 and the touch panel 100 integrated with the display panel unit 310. At this time, the description related to the display panel unit 310 with reference to FIG. 9 may be directly applied to the display panel unit 310, and a detailed description of the display panel unit 310 will be omitted herein.

In the present embodiment, the front substrate 314 may be disposed on the front surface of the touch panel 100, and the display panel 312 and the rear substrate 316 may be disposed on the rear surface of the touch panel 100. At this time, a first adhesive layer 322 may be interposed between the touch panel 100 and the front substrate 314 to attach the same to each other, and a second adhesive layer 324 may be interposed between the touch panel 100 and the display panel 312 to attach the same to each other. As the touch panel 100 is located inside the display panel unit 310, the touch panel 100 may be integrated with the display panel unit 310 in an in-cell form.

Although FIGS. 9 and 10 illustrate the touch panel 100 as having the structure of FIG. 2, the present disclosure is not limited thereto, and the touch panel 100 may have any of various structures. In addition, although the touch panel 100 is illustrated as being integrated with the display panel unit 310 using the adhesive layer(s) 320; 322 and 324, various other modifications are possible. For example, a spacer may be interposed between the touch panel 100 and the display panel unit 310 such that the touch panel 100 and the display panel unit 310 are fixed to each other with an air gap therebetween.

As is apparent from the above description, in a touch panel according to the present embodiment, a first sensor part and a second sensor part may be arranged on the same plane over the same conductive film, thus having a simplified structure. Thereby, the number of conductive films may be reduced, and an adhesive layer for bonding the conductive films to each other may be omitted. In this way, the thickness of the touch panel may be minimized, and the touch panel may be manufactured at low cost via a simplified process.

In addition, a structure of first and second wiring parts for connecting the first and second sensor parts to a flexible printed circuit board may be further simplified. In particular, the number of pads and the number of wirings connected to the pads may be minimized. In this way, the area of a non-active area in which the pads and the wirings are arranged may be considerably reduced, which may realize a narrow bezel. Therefore, the present disclosure has been made in view of the above problems, and it is an object of the present disclosure to provide a touch panel, which may have a simplified structure and may be formed at low manufacturing costs, and a display apparatus including the same.

In accordance with an aspect of the present disclosure, the above and other objects can be accomplished by the provision of a touch panel a conductive film including a first electrode and a second electrode arranged on one surface thereof so as to be spaced apart from each other, wherein the first electrode includes a plurality of first sensor parts spaced apart from one another in a first direction, the first sensor parts extending a long length in a second direction crossing the first direction, and a plurality of first wiring parts electrically connected to the first sensor parts, wherein the second electrode includes a plurality of second sensor parts spaced apart from one another in the first direction, the second sensor parts having a shape complementary to the first sensor parts, and a second wiring part electrically connected to the second sensor parts, wherein each of the second sensor parts includes a plurality of sensor portions including a first sensor portion located at a first position in the second direction and a second sensor portion located at a second position, which is different from the first position, in the second direction, and wherein the second wiring part includes a plurality of connection portions including a first connection portion for connecting the first sensor portions of the second sensor parts to one another and a second connection portion located adjacent to the first wiring part for connecting the second sensor portions of the second sensor parts to one another In accordance with an aspect of the present disclosure, there is provided a touch panel described above, and a display panel integrated with the touch panel. In some embodiments of the disclosure, the second wiring part includes a plurality of pads connected to the connection portions, and wherein the number of the pads is less than the number of all of the first and second sensor portions of the second sensor parts. In some embodiments of the disclosure, the pads of the second wiring part include one first pad provided so as to correspond to the first sensor portions of the second sensor parts, and one second pad provided so as to correspond to the second sensor portions of the second sensor parts.

In some embodiments of the disclosure, the number of the pads of the second wiring part is equal to the number of the first and second sensor portions of the second sensor parts. In some embodiments of the disclosure, the second electrode further includes a plurality of extension portions connected to the respective sensor portions of the second sensor part, and wherein the extension portions and the connection portions are disposed on different layers. In some embodiments of the disclosure, the connection portions are spaced apart from the extension portions with an insulation layer interposed therebetween, and are connected to the extension portions through a plurality of contact holes.

In some embodiments of the disclosure, the insulation layer is formed in a portion corresponding to a region in which the first wiring part and the connection portions overlap each other. In some embodiments of the disclosure, the contact holes include a plurality of first contact holes formed at positions at which the first connection portion overlaps with the extension portions connected to the first sensor portions of the second sensor parts, and a plurality of second contact holes formed at positions at which the second connection portion overlaps with the extension portions connected to the second sensor portions of the second sensor parts. In some embodiments of the disclosure, the first contact holes and the second contact holes are oriented in a direction that is inclined relative to the first direction and the second direction.

In some embodiments of the disclosure, the connection portions of the second wiring part are disposed on a plane different from that in which the second sensor parts are disposed, and wherein the pads of the second wiring part are disposed on the same plane as the second sensor parts. In some embodiments of the disclosure, each first wiring part includes a pad connected to the first sensor part, and wherein the pad of the first wiring part is disposed on the same plane as the first sensor part. In some embodiments of the disclosure, the first wiring parts include a plurality of pads corresponding to the first sensor parts in a one-to-one manner. In some embodiments of the disclosure, the first sensor parts and the second sensor parts are disposed on the same plane over the conductive film. In some embodiments of the disclosure, the first sensor parts and the second sensor parts are formed of the same material. In some embodiments of the disclosure, the first sensor parts and the second sensor parts include nano-material conductors forming a network structure.

In some embodiments of the disclosure, wherein the conductive film includes a base film having one surface on which the first sensor parts and the second sensor parts are disposed, a first hard coating layer located between the base film and the first and second sensor parts, an over-coating layer for covering the first sensor parts and the second sensor parts and a second hard coating layer disposed on a remaining surface of the base film. In some embodiments of the disclosure, the first wiring part includes a pad connected to the first sensor part, wherein the second wiring part includes a pad connected to the second sensor part, and wherein the touch panel further comprises one flexible printed circuit board electrically connected to both the pad of the first wiring part and the pad of the second wiring part. In some embodiments of the disclosure, the pad of the first wiring part and the pad of the second wiring part are disposed on the same plane. In some embodiments of the disclosure, the touch panel further comprises a cover substrate disposed over the conductive film and a transparent adhesive layer interposed between the cover substrate and the conductive film for bonding the cover substrate and the conductive film to each other.

It will be further understood that, throughout this specification, when one element is referred to as "comprising" another element, the term "comprising" specifies presence of another element but does not preclude presence of other additional elements, unless context clearly indicates otherwise. Additionally, it will be understood that when one element such as a layer, a film, a region or a plate is referred to as being "on" another element, the one element may be directly on the another element, and one or more intervening elements may also be present. In contrast, when one element such as a layer, a film, a region or a plate is referred to as being "directly on" another element, one or more intervening elements are not present. Hereinafter, a touch panel and a display apparatus including the same will be described in detail with reference to the accompanying drawings.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
 a conductive film having a first electrode and a second electrode arranged on a surface of the conductive film and spaced apart from each other,
 wherein the first electrode includes:
  a plurality of first sensor lines spaced apart from one another in a first direction, the first plurality of sensor lines extending relatively longer in a second direction crossing the first direction, and
  first wiring lines electrically connected to the plurality of first sensor lines;
 wherein the second electrode includes:
  a plurality of second sensor lines spaced apart from one another in the first direction, the plurality of second sensor lines having a shape that is complementary to a shape of the plurality of first sensor lines, and
  second wiring lines electrically connected to the second sensor lines,
  wherein the plurality of second sensor lines includes a plurality of sensor portions, the plurality of sensor portions including first sensor portions located at a first position in the second direction and second sensor portions located at a second position, which is different from the first position, in the second direction,
 wherein the second wiring lines includes a plurality of connection lines including a first connection line connecting the first sensor portions to one another and a second connection line located adjacent to the first wiring lines and connecting the second sensor portions to one another, and
 wherein the first and second electrodes form a plurality of the complementary shapes that are spaced apart from each other, and at least one of the second wiring lines is located between the second sensor portion and the first sensor portion of another one of the complementary shapes that is adjacent to the second sensor portion.

2. The touch panel according to claim 1, wherein the second wiring lines includes a plurality of pads connected to the plurality of connection lines, and wherein a number of the plurality of pads is less than a number of the first sensor portions and second sensor portions.

3. The touch panel according to claim 2, wherein the plurality of pads of the second wiring lines include a first pad coupled to the first sensor portions, and a second pad coupled to the second sensor portions.

4. The touch panel according to claim 1, wherein the second wiring lines includes a plurality of pads connected to the plurality of connection lines, and wherein a number of the plurality of pads of the second wiring lines is equal to a number of the first sensor portions and second sensor portions.

5. The touch panel according to claim 1, wherein the second electrode further includes a plurality of extension lines connected, respectively, to the plurality of sensor portions, and
wherein the plurality of extension lines and the plurality of connection lines are provided on different layers included in the touch panel.

6. The touch panel according to claim 5, wherein an insulation layer is interposed between the plurality of connection lines and the plurality of extension lines, and the plurality of connection lines and the extension lines are connected through a plurality of contact holes in the insulation layer.

7. The touch panel according to claim 6, wherein the insulation layer is formed in a region in which the first wiring lines and the plurality of connection lines overlap.

8. The touch panel according to claim 6, wherein the plurality of contact holes include
a plurality of first contact holes formed at positions at which the first connection line overlaps a subset the plurality of extension lines connected to the first sensor portions, and
a plurality of second contact holes formed at positions at which the second connection line overlaps with another subset of the extension lines connected to the second sensor portions.

9. The touch panel according to claim 8, wherein the plurality of first contact holes and the plurality of second contact holes are oriented in a third direction that differs from the first direction and the second direction.

10. The touch panel according to claim 2, wherein the plurality of connection lines of the second wiring lines are provided on a first plane that is different from a second plane in which the plurality of second sensor lines are provided, and
wherein the plurality of pads of the second wiring lines are provided on the second plane.

11. The touch panel according to claim 1, wherein each of the first wiring lines includes a pad connected to a corresponding one of the plurality of first sensor lines, and
wherein the pads of the first wiring lines and the plurality of first sensor lines are provided on a common plane.

12. The touch panel according to claim 1, wherein the first wiring lines include a plurality of pads corresponding to the plurality of first sensor lines.

13. The touch panel according to claim 1, wherein the plurality of first sensor lines and the plurality of second sensor lines are provided on a common plane over the conductive film.

14. The touch panel according to claim 1, wherein the plurality of first sensor lines and the plurality of second sensor lines are formed of a same material.

15. The touch panel according to claim 1, wherein the plurality of first sensor lines and the plurality of second sensor lines include nano-material conductors forming a network structure.

16. The touch panel according to claim 15, wherein the conductive film includes:
a base film includes a surface on which the first plurality of sensor lines and the plurality of second sensor lines are provided;
a first hard coating layer located between the base film and the plurality of first sensor lines and the plurality of second sensor lines;
an over-coating layer covering the plurality of first sensor lines and the plurality of second sensor lines; and
a second hard coating layer provided on another surface of the base film.

17. The touch panel according to claim 1, wherein the first wiring lines includes pads connected, respectively, to the plurality of first sensor lines,
wherein the second wiring lines include pads connected, respectively, to the plurality of second sensor lines, and
wherein the touch panel further comprises one flexible printed circuit board electrically connected to the pads of the first wiring lines and the pads of the second wiring lines.

18. The touch panel according to claim 17, wherein the pads of the first wiring lines and the pads of the second wiring lines are provided on a common plane.

19. The touch panel according to claim 1, further comprising:
a cover substrate provided over the conductive film; and
a transparent adhesive layer interposed between the cover substrate and the conductive film, the transparent adhesive layer bonding the cover substrate and the conductive film to each other.

20. The touch panel according to claim 1, wherein a display panel is integrated with the touch panel.

* * * * *